(12) United States Patent
Kohira

(10) Patent No.: US 7,542,238 B2
(45) Date of Patent: Jun. 2, 2009

(54) AERODYNAMIC MAGNETIC HEAD SLIDER AND MAGNETIC DISK DRIVE

(75) Inventor: Hidekazu Kohira, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 350 days.

(21) Appl. No.: 11/104,998

(22) Filed: Apr. 12, 2005

(65) Prior Publication Data

US 2005/0225902 A1    Oct. 13, 2005

(30) Foreign Application Priority Data

Apr. 12, 2004   (JP)   ............... 2004-116551

(51) Int. Cl.
*G11B 5/60* (2006.01)
(52) U.S. Cl. .................................. 360/235.8
(58) Field of Classification Search ............... 360/235.8
See application file for complete search history.

(56) References Cited

U.S. PATENT DOCUMENTS

| | | | |
|---|---|---|---|
| 5,345,353 A | | 9/1994 | Krantz et al. |
| 6,055,128 A * | | 4/2000 | Dorius et al. ............ 360/235.8 |
| 6,144,529 A * | | 11/2000 | Wada et al. ............... 360/236.1 |
| 6,462,909 B1 * | | 10/2002 | Boutaghou et al. ....... 360/235.8 |
| 6,483,667 B1 | | 11/2002 | Berg et al. |
| 6,490,135 B1 * | | 12/2002 | Sannino et al. .......... 360/235.8 |
| 6,504,682 B1 | | 1/2003 | Sannino et al. |
| 6,556,381 B2 * | | 4/2003 | Kohira et al. ............ 360/236.3 |
| 6,661,612 B1 * | | 12/2003 | Peng ....................... 360/236.3 |
| 6,683,755 B2 * | | 1/2004 | Koishi ..................... 360/235.6 |
| 6,714,382 B1 * | | 3/2004 | Alexopoulos et al. ..... 360/235.8 |
| 2002/0001157 A1 * | | 1/2002 | Kang et al. ............... 360/236.3 |
| 2002/0018320 A1 * | | 2/2002 | Levi et al. ................ 360/236.3 |
| 2004/0021987 A1 * | | 2/2004 | Yotsuya et al. ........... 360/235.8 |
| 2004/0032693 A1 * | | 2/2004 | Imamura et al. ......... 360/235.7 |

FOREIGN PATENT DOCUMENTS

| | | |
|---|---|---|
| JP | 06-203514 A | 7/1994 |
| JP | 08-102164 A | 4/1996 |
| JP | 11-025629 A | 1/1999 |
| JP | 2000-057724 A | 2/2000 |
| JP | 2000-260015 A | 9/2000 |
| JP | 2001-250215 A | 9/2001 |
| JP | 2001250215 A * | 9/2001 |
| JP | 2003-151233 A | 5/2003 |
| JP | 2003-515869 A | 5/2003 |

* cited by examiner

*Primary Examiner*—David D Davis
(74) *Attorney, Agent, or Firm*—Townsend and Townsend and Crew LLP; John Henkhaus

(57) ABSTRACT

Embodiments of the invention prevent the reduction of the flying height of a magnetic head slider at a high altitude and thereby to improve the reliability of a magnetic disk drive. In one embodiment, a magnetic head slider has an air inlet end, an air outlet end, and an aerodynamic structure (air bearing surface). The aerodynamic structure includes: a plurality of inlet rails respectively having inlet rail surfaces; an outlet rail having an outlet rail surface flush with the inlet rail surfaces and holding a magnetic head; a bearing surface extending at a predetermined first depth $\delta 1$ from a reference plane including the inlet and the outlet rail surfaces; a negative-pressure surface extending in a plane at a predetermined second depth $\delta 2$ greater than the first depth $\delta 1$ from the reference plane; and longitudinal lands of a predetermined height h formed on the inlet rails. The bearing surface and the inlet rail surfaces extend between the air inlet end and the lands.

18 Claims, 10 Drawing Sheets

AERODYNAMIC MAGNETIC HEAD SLIDER AND MAGNETIC DISK DRIVE

CROSS-REFERENCES TO RELATED APPLICATIONS

This application claims priority from Japanese Patent Application No. JP2004-116551, filed Apr. 12, 2004, the entire disclosure of which is incorporated herein by reference.

BACKGROUND OF THE INVENTION

The present invention relates to a magnetic disk drive and, more particularly, to a magnetic head slider capable of suppressing the decrease of its flying height when used at a high altitude.

To increase recording density in recording data by a magnetic disk drive for high-density recording having a magnetic head slider (hereinafter referred to simply as "slider") provided with a magnetic head, it is important to reduce a flying height defined by a clearance between the slider and a rotating magnetic disk. Therefore, it is important to prevent the reduction of flying height as effectively as possible when the magnetic disk drive is used at a high altitude.

Generally, the flying height of the slider decreases at a high altitude because the mean free path of air serving as a working fluid for the slider increases at a high altitude. The reduction of the flying height is undesirable from the viewpoint of the reliability of the magnetic disk drive because the reduction of the flying height increases the possibility of the slider coming into contact with the magnetic disk. It is particularly desirable for a magnetic disk drive using a 2.5 in. or smaller disk and built in a portable information processing device that is often used at a high altitude to prevent the change of the flying height of the slider with the increase of altitude, i.e., with the drop of the atmospheric pressure.

A technique for suppressing the reduction of the flying height of the slider with the increase of altitude is disclosed in JP-A No. 2000-57724 (Patent Document 1). According to Patent Document 1, the reduction of the flying height at a high altitude can be effectively suppressed by optimizing the ratio between the depth of a step bearing surface and the depth of a negative-pressure groove.

Known magnetic head sliders similar in construction to a magnetic head slider according to the present invention are disclosed in JP-A Nos. 6-203514, 8-102164, 11-25629, 2003-151233, 2001-250215 and 2000-260015, and PCT Patent Publication No. WO2003/515869. All those magnetic head sliders use a rail having a stepped surface or provided with a pad on an air inlet side to reduce adhesion and friction between the slider and the magnetic disk when the slide comes into contact with the magnetic disk.

The following patent documents are cited in the present specification:
Patent Document 1: JP-A No. 2000-57724;
Patent Document 2: PCT Patent Publication No. WO2003/515869;
Patent Document 3: JP-A No. 8-102164;
Patent Document 4: JP-A No. 11-25629;
Patent Document 5: JP-A No. 2003-151233;
Patent Document 6: JP-A No. 6-203514;
Patent Document 7: JP-A No. 2001-250215; and
Patent Document 8: JP-A No. 2000-260015.

BRIEF SUMMARY OF THE INVENTION

A first task to be achieved to increase recording density in which a magnetic disk drive records data without spoiling the reliability of the magnetic disk drive is to reduce flying height from the entire surface of a magnetic disk and to suppress the reduction of flying height at a high altitude.

The magnetic head slider disclosed in Patent document 1 is capable of reducing the reduction of flying height at a high altitude.

The miniaturization of the slider and the reduction of the diameter of the disk have progressively advanced with the miniaturization of the magnetic disk drive. Since a miniaturized slider has a small area and the circumferential speed of a small-diameter magnetic disk is low, negative pressure that can be produced by the miniaturized slider is low. Therefore, suppression of the reduction of the flying height at a high altitude by those known techniques has become progressively difficult. Suppression of the reduction of the flying height of a small slider of 0.85 mm in overall length and 0.7 mm in overall width generally called a femtoslider at a high altitude is difficult and further improvement of a small slider has been desired.

Sliders similar in construction to a slider according to the present invention and techniques to reduce frictional force that acts between the slider and a magnetic disk when the slider comes into contact with the magnetic disk are disclosed in JP-A Nos. 6-203514, 8-102164, 11-25629, 2003-151233, 2001-250215 and 2000-260015, and PCT Patent Publication No. WO2003/515869

However, nothing about a method of reducing the effect of the atmospheric pressure on the flying height is mentioned in those patent documents, and the sliders disclosed in those patent documents are unable to achieve the advantages of the present invention.

The present invention has been made in view of such circumstances and it is therefore a feature of the present invention to provide a magnetic head slider capable of minimizing the reduction of its flying height at a high altitude.

According to a first aspect of the present invention, there is provided a magnetic head slider comprising: an air inlet end; an air outlet end; and an aerodynamic structure; wherein the aerodynamic structure includes: a plurality of inlet rails respectively having inlet rail surfaces; an outlet rail having an outlet rail surface flush with the inlet rail surfaces and holding a magnetic head; a bearing surface extending at a predetermined first depth □1 from a reference plane including the inlet and the outlet rail surfaces; a negative-pressure surface extending in a plane at a predetermined second depth □2 greater than the first depth □1 from the reference plane; and longitudinal lands of a predetermined height h formed on the inlet rails; and wherein the bearing surface and the inlet rail surfaces extend between the air inlet end and the lands.

According to a second aspect of the present invention, there is provided a magnetic head slider comprising: an air inlet end; an air outlet end; and an aerodynamic structure; wherein the aerodynamic structure includes: a plurality of inlet rails respectively having inlet rail surfaces; an outlet rail having an outlet rail surface flush with the inlet rail surfaces and holding a magnetic head; a bearing surface extending at a predetermined first depth □1 from a reference plane including the inlet and the outlet rail surfaces; a negative-pressure surface extending in a plane at a predetermined second depth □2 greater than the first depth □1 from the reference plane; and longitudinal lands of a predetermined height h formed on the inlet rails; wherein the bearing surface and the inlet rail surfaces extend between the air inlet end and the lands; and wherein a load is placed on the magnetic head slider at a point on the side of the air inlet end with respect to the center of the magnetic head slider.

According to the present invention, the reduction of the flying height of the magnetic head slider at a high altitude can be prevented and thereby the reliability of a magnetic disk drive can be improved.

DETAILED DESCRIPTION OF THE INVENTION

Figure 1:
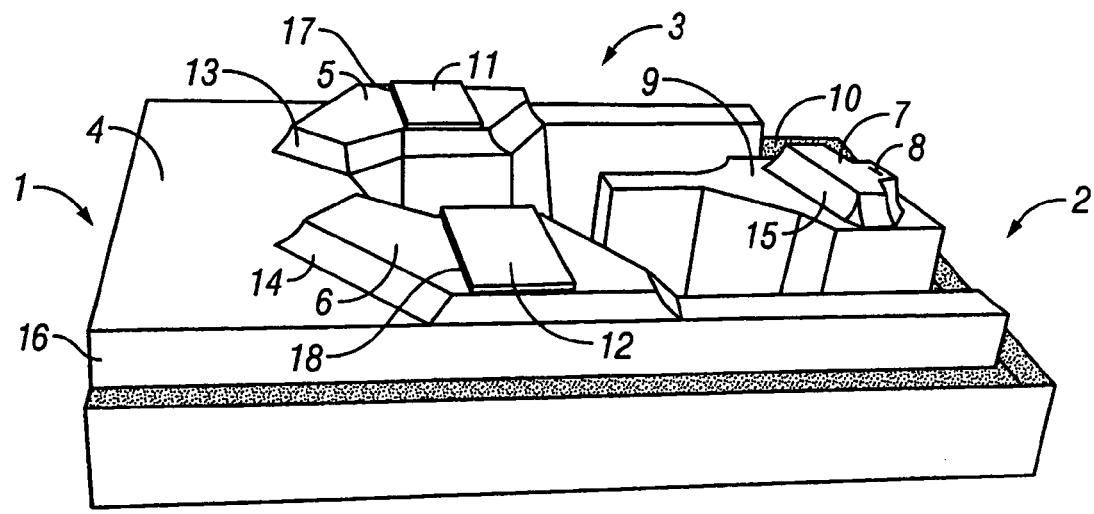
FIG. 1 is a perspective view of a magnetic head slider in a first embodiment according to the present invention.
Figure 2:
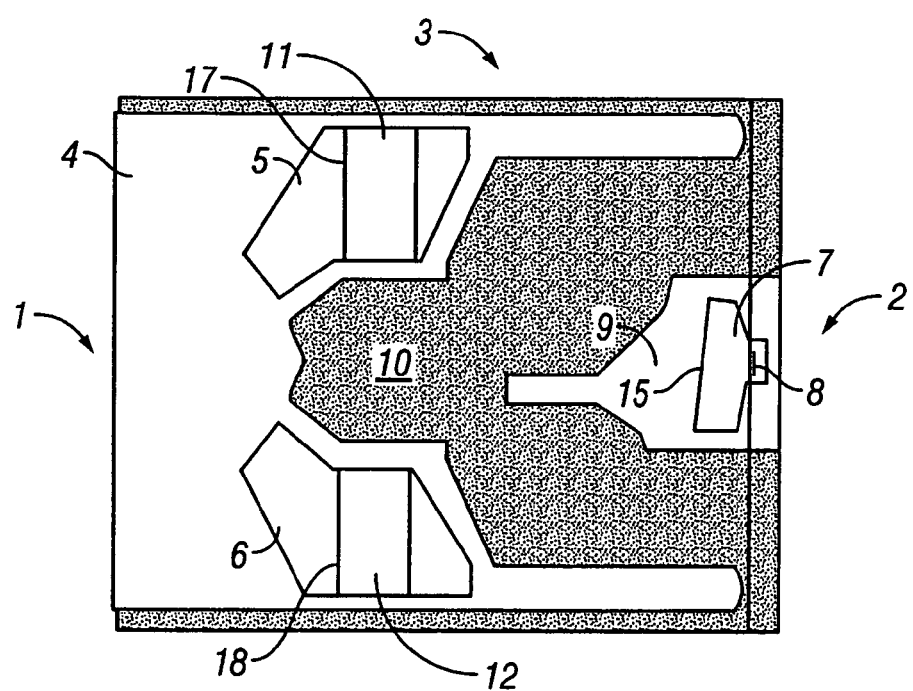
FIG. 2 is a plan view of the magnetic head slider in the first embodiment.
Figure 3:
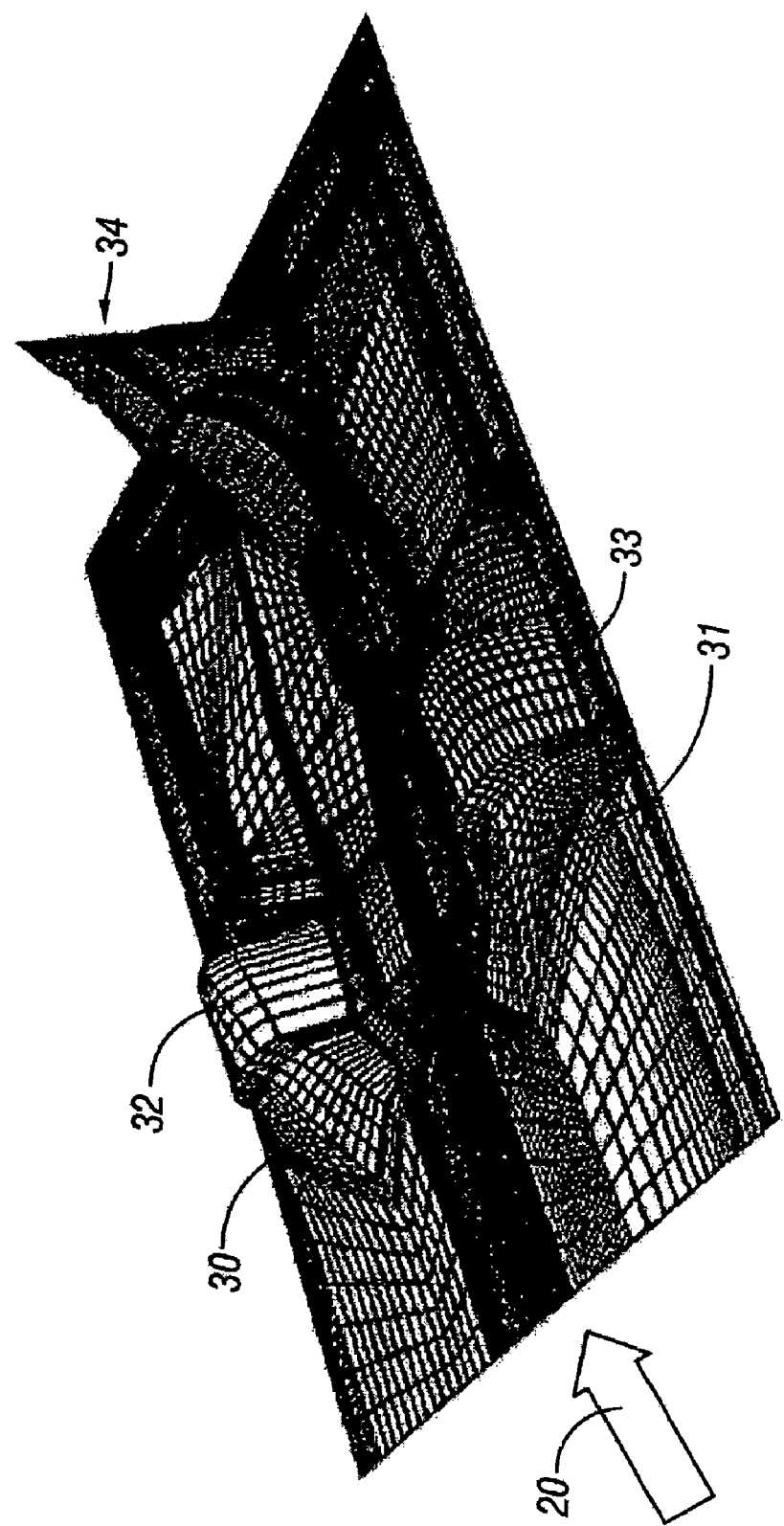
FIG. 3 is a three-dimensional diagram showing a pressure distribution on the magnetic head slider in the first embodiment.
Figure 4:
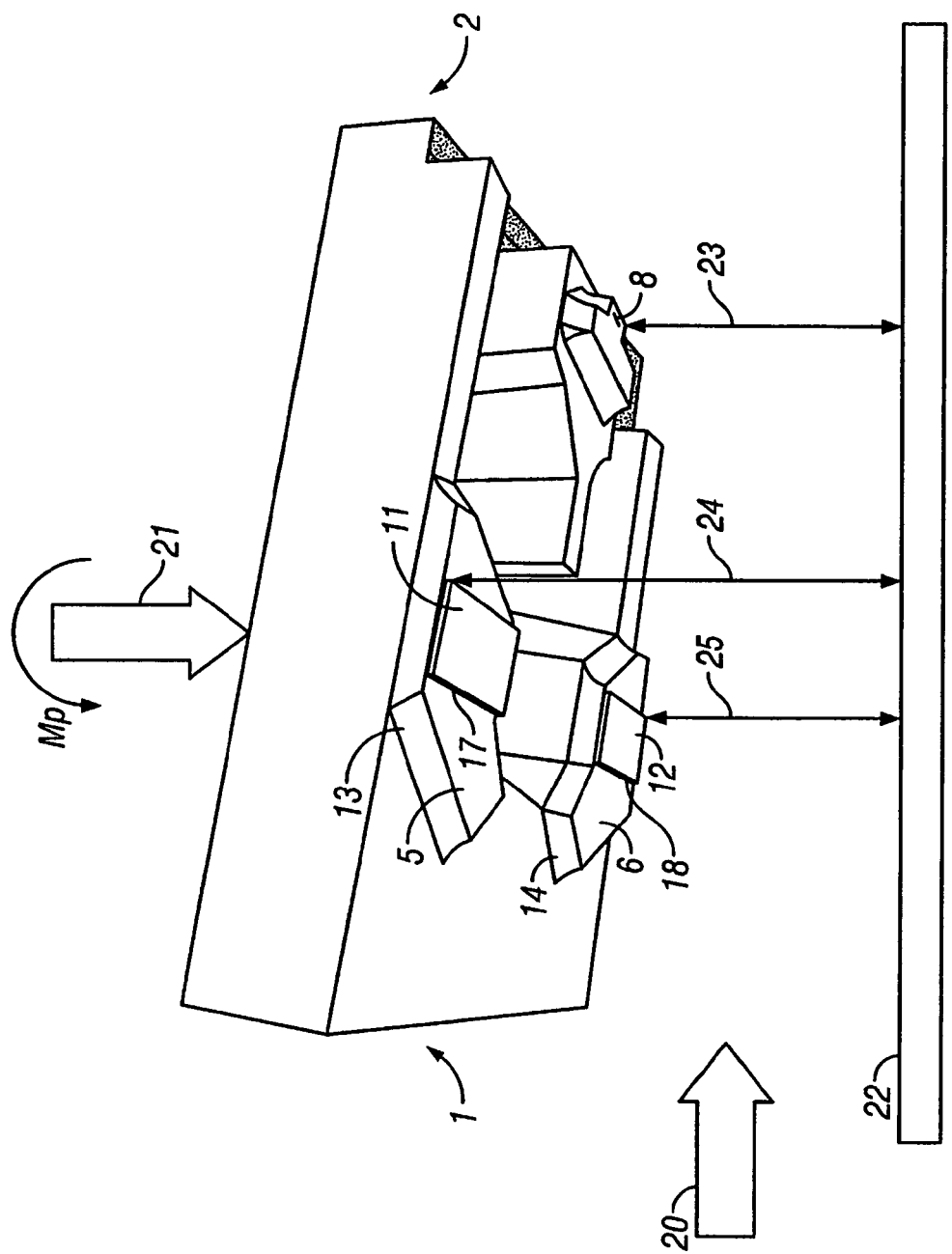
FIG. 4 is a perspective view of the magnetic head slider in the first embodiment flying over a magnetic disk.

A magnetic head slider in a first embodiment according to the present invention and a magnetic disk drive provided with this magnetic head slider will be described with reference to the accompanying drawings. FIG. 1 is a perspective view of the magnetic head slider in the first embodiment, FIG. 2 is a plan view of the slider shown in FIG. 1, FIG. 3 is a three-dimensional diagram showing a pressure distribution on the slider shown in FIG. 1, and FIG. 4 is a perspective view of the slider flying over a disk.

Referring to FIGS. 1 to 4, the slider in the first embodiment has an air inlet end 1, an air outlet end 2 and an aerodynamic structure (air bearing surface) 3. The aerodynamic structure 3 includes an inlet bearing surface 4, inlet rails 5 and 6 respectively having an inlet rail surfaces, an outlet rail 7 having an outlet rail surface and holding a magnetic head 8, an outlet bearing surface 9, a negative-pressure groove 10, and lands 11 and 12 formed on the respective inlet rails 5 and 6.

The inlet rail surfaces of the inlet rails 5 and 6 and the outlet rail surface of the outlet rail 7 are substantially flush with each other and included in a reference plane. Air 20 that flows through a space between the slider and a magnetic disk 22 produces an aerodynamic pressure to cause the slider to fly over the magnetic disk 22. Thus, the inlet rail surfaces 5 and 6 and the outlet rail surface of the outlet rail 7 serve as positive-pressure rail surfaces.

The inlet bearing surface 4 and the outlet bearing surface 9 are substantially flush with each other and included in a plane at a depth of about 200 nm from the reference plane including the inlet rail surfaces of the inlet rails 5 and 6 and the outlet rail surface of the outlet rail 7. Air having flowed through the air inlet end 1 into the space between the slider and the magnetic disk 22 flows along the inlet bearing surface 4 and the outlet bearing surface 9. The aerodynamic pressure of air 20 is increased by first rising surfaces 13, 14 and 15. Air 20 of an increased aerodynamic pressure flows along the inlet rail surfaces of the inlet rails 5 and 6 and the outlet rail surface of the outlet rail 7.

The aerodynamic pressure of air 20 flowing along the inlet rail surfaces of the inlet rails 5 and 6 and reaching the lands 11 and 12 is further increased to a high aerodynamic pressure sufficient to lift up the slider by second rising surfaces 17 and 18, i.e., the front surfaces of the lands 11 and 12. The height of the second rising surfaces 17 and 18 of the lands 11 and 12 from the inlet rail surfaces of the inlet rails 5 and 6 is on the order of 20 nm. The lands 11 and 12 need to have a certain length in the flowing direction of air 20, i.e., along the length of the slider, to produce a high aerodynamic pressure by the lands 11 and 12. Such a high aerodynamic pressure, namely, an aerodynamic lift, can be produced by the lands 11 and 12 having the second rising surfaces 17 and 18 of such a very low height.

The lands 11 and 12 formed on the inlet rails 5 and 6 are an important feature of the present invention. The first rising surfaces 13 and 14 of the inlet rails 5 and 6 produce aerodynamic pressures 30 and 31 to lift up the slider, and the second rising surfaces 17 and 18 of the lands 11 and 12 increase the aerodynamic pressures to higher aerodynamic pressures 32 and 33. The first rising surface 15 increases the aerodynamic pressure of air flowing along the outlet bearing surface 9 to produce an aerodynamic pressure 34 at the outlet rail 7.

The length of the lands 11 and 12 necessary for producing a high positive pressure is about 50 μm or above, preferably, about 100 μm or above, and must be shorter than the length of the inlet rails 5 and 6. In this embodiment, the length of the lands 11 and 12 is about 100 μm.

Since the arrangement of the rising surfaces at two stages is effective in producing a high aerodynamic lift, the sizes of the inlet rails 5 and 6 and the outlet rail 7 may be small.

The inlet rail surfaces of the inlet rails 5 and 6 and the outlet rail surfaces of the outlet rail 7 that serve in producing the aerodynamic pressure are positive-pressure rail surfaces. Since the area of the rail surfaces of the slider of the present embodiment necessary for producing a predetermined aerodynamic lift may be small, the reduction of the aerodynamic lift at a high altitude can be minimized, which will be described later.

The depth 16 of the negative-pressure groove 10 from the plane including the inlet bearing surface 4 is on the order of 800 nm. The depth of the negative-pressure groove 10 from the reference plane including the inlet rail surfaces of the inlet rails 5 and 6 is on the order of 1 μm.

The slider in the first embodiment is the so-called femtoslider of 0.85 mm in length, 0.7 mm in width and 0.23 mm in thickness. Generally, the area of the negative pressure groove 10 decreases with the decrease of the area of the slider, negative pressure that can be produced by the slider decreases with the decrease of the area of the slider and, consequently, the reduction of the aerodynamic lift at a high altitude increases.

Recently, the magnetic disk drive has been progressively miniaturized and magnetic disks of smaller diameters that are rotated at low circumferential speeds have been used. Consequently, negative pressure that can be produced by the slider has been progressively decreased. These matters are factors that increase the reduction of aerodynamic lift at a high altitude.

As mentioned above, the present embodiment achieves the minimization of the reduction of the aerodynamic lift at a high altitude successively because the area of the rails of the slider in the first embodiment necessary for producing a predetermined aerodynamic lift may be small.

A known technique for reducing adhesion at the start of the magnetic disk drive forms minute pads on rail surfaces. The pads must be formed in the smallest possible surface area to reduce adhesion. Such minute pads are ineffective in producing a high aerodynamic lift and do not have the effect of the present invention. Conventional pads mentioned in, for example, Patent document 2 are formed intentionally in a small size so that the pads may not affect aerodynamic lift that acts on the slider and are formed on a technical idea that is quite contrary to a technical idea on which the present invention is based.

The effect of the first embodiment will be concretely described. Air 20 causes the slider to fly over the disk 22 in an inclined position such that the flying height of the air inlet end 1 is higher than that of the air outlet end 2. Consequently, the flying height 23 of the outlet rail surface of the outlet rail holding the magnetic head 8 is the lowest.

If the flying height 24 of the back end of the land 11 and the flying height 25 of the back end of the land 12 is lower than the flying height 23 of the outlet rail surface of the outlet rail 7, the lands 11 and 12 touch the disk 22. If the lands 11 and 12 touch the disk 22, the slider shakes violently and, if the worst comes to the worst, the slider crushes. Therefore, the lands 11 and 12 of the slider must be designed such that the slider floats in a proper position and the flying heights 24 and 25 never decrease below the flying height 23.

Figure 5:
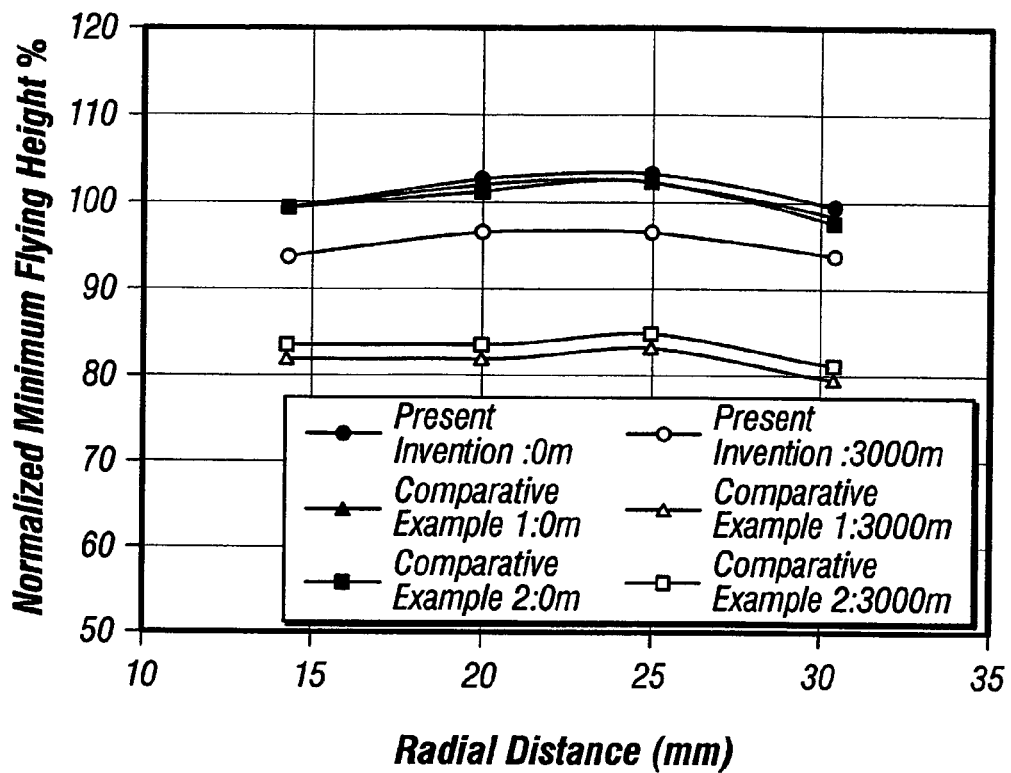
FIG. 5 is a graph showing calculated flying height profiles of the magnetic slider in the first embodiment and magnetic head sliders in Comparative examples 1 and 2.

FIG. 5 is a graph showing calculated flying height profiles, i.e., flying height distributions along the radius of a disk, of the slider in the first embodiment at altitudes of 0 m and 3000 mm. The normal operation of the magnetic disk drive must be guaranteed for an altitude of 3000 m (about 0.7 atm.) and hence the reduction of the flying height at an altitude of 3000 m must be suppressed to the least possible extent. In FIG. 5, flying height at the inner circumference of a 2.5 in. magnetic disk normalized by a flying height at an altitude of 0 m is measured on the vertical axis. The disk was rotated at 4200 rpm.

As obvious from FIG. 5, the flying height reduction ratio, i.e., the ratio of a reduction of the flying height of the slider due to the increase of the altitude of the slider from 0 m to 3000 m, is in a low range of about 6 to about 7%.

Figure 6:
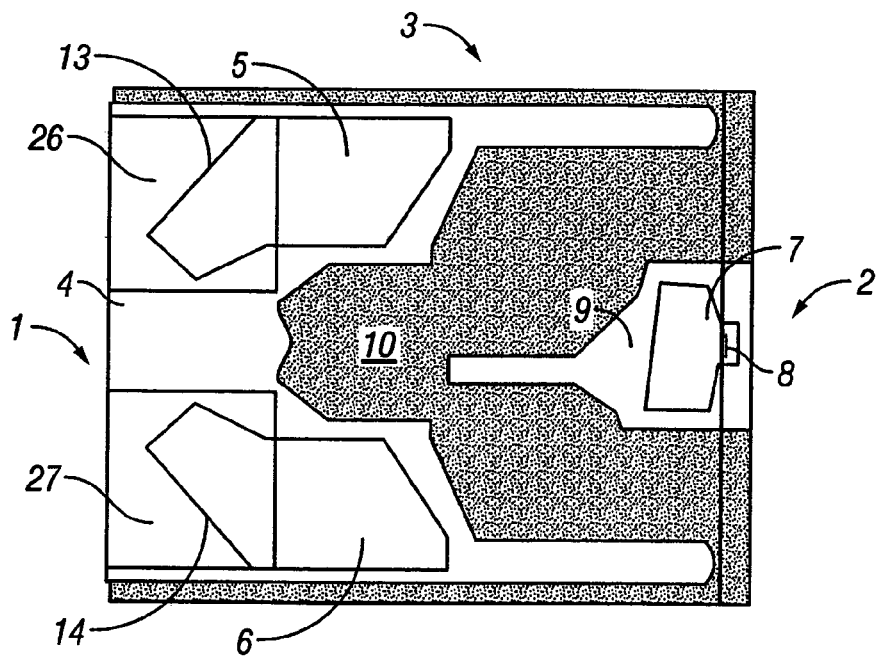
FIG. 6 is a plan view of a magnetic head slider in Comparative example 1.

FIG. 6 is a plan view of a prior slider in comparative example 1 disclosed in Patent Document 5. This prior slider differs from the slider of the first embodiment in that the latter has lands 26 and 27 extending backward from an air inlet end 1, and only first rising surfaces 13 and 14 that have an effect of increasing the aerodynamic pressure. Therefore, the prior slider needs to include inlet rails 5 and 6 having large inlet rail surfaces, and an outlet rail 7 having a large outlet rail surface to be lifted at a floating lift equal to that at which the slider in the first embodiment is lifted.

Figure 7:
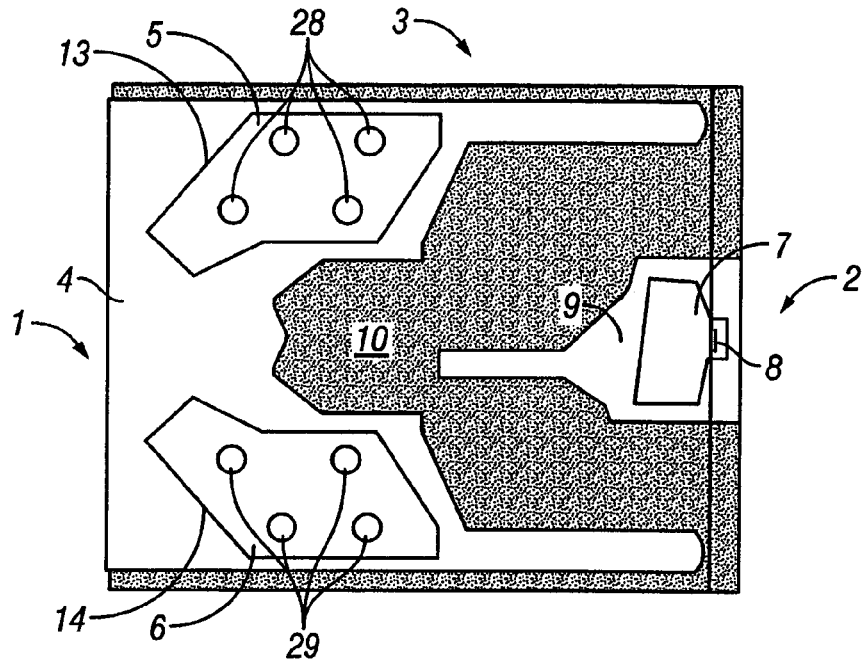
FIG. 7 is a plan view of a magnetic head slider in Comparative example 2.

FIG. 7 is a plan view of a prior slider in comparative example 2 disclosed in Patent Document 2. The slider in comparative example 2 has inlet rails 5 and 6 provided with a plurality of minute pads 28 and 29 on their inlet rail surfaces, respectively, to reduce adhesion between the slider and the disk while a magnetic disk drive provided with the slider is stopped. Since the length of the minute pads 28 and 29 are short, the effect of the minute pads 28 and 29 in increasing the aerodynamic pressure to lift up the slider is little. Therefore, the slider in comparative example 2 needs large inlet rails 5 and 6 and a large outlet rail 7 to fly at the same flying height as the slider in the first embodiment.

Flying height profiles of the sliders in comparative examples 1 and 2 respectively shown in FIGS. 6 and 7 at altitudes of 0 m and 3000 mm are shown in FIG. 5. Flying height at the inner circumference of the disk normalized by a flying height at an altitude of 0 m is measured on the vertical axis. Flying height reduction ratios, i.e., the ratios of reductions of the flying heights of the sliders due to the increase of altitude of the sliders from 0 m to 3000 m to flying heights of the sliders at an altitude of 0 m, are in a high range of about 17 to 20%. As obvious from FIG. 5, the reduction of the flying height of the slider in the first embodiment due to the increase of the altitude of the slider is very small.

Figure 8:
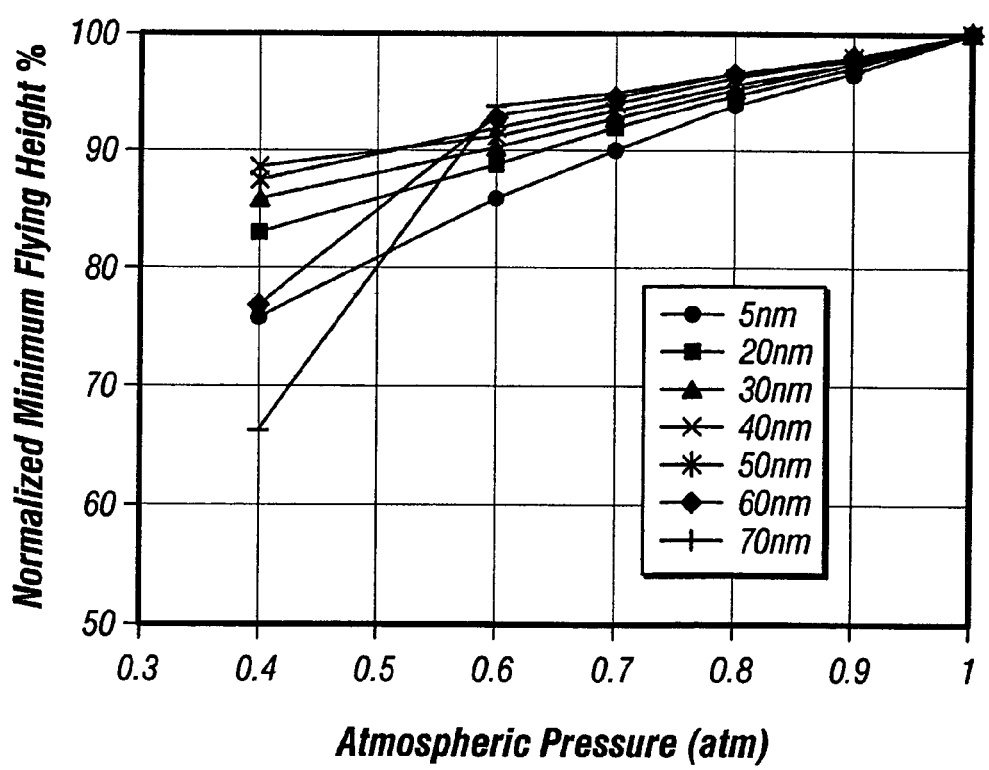
FIG. 8 is a graph showing the calculated variation of the flying height of the magnetic head slider in the first embodiment with ambient atmospheric pressure for the height of the second rising surfaces as a parameter.

As mentioned above, the flying heights 24 and 25 of the back ends of the lands 11 and 12 must be higher than the flying height 23 of the backend of the outlet rail 7 to ensure the reliability of the magnetic disk drive. FIG. 8 is a graph showing the calculated variation of the flying heights 23, 24 and 25 with ambient atmospheric pressure for the height of the second rising surfaces 17 and 18 as a parameter. In FIG. 8, calculated normalized flying height obtained by normalizing the lowest one of the flying heights 23, 24 and 25 by the lowest flying height 23 at the atmospheric pressure is measured on the vertical axis.

As obvious from FIG. 8, the minimum flying height decreases with the decrease of atmospheric pressure, i.e., with the increase of altitude, regardless of the height of the second rising surfaces. When the height of the second rising surfaces is 60 nm or above, the minimum flying height drops sharply after the atmospheric pressure decreases below 0.6 atm. Such a sharp drop of flying height occurs due to the change of the floating position of the slider that caused the flying heights 24 and 25 of the back ends of the lands 11 and 12 to decrease below the flying height 23 of the back end of the outlet rail 7. Such a positional change of the slider must be avoided from the viewpoint of reliability of the magnetic disk drive. Thus, the height of the second rising surfaces 17 and 18 must be lower than about 60 nm. Desirably, the height of the second rising surfaces 17 and 18 is about 50 nm or below.

If the minimum flying height is 10 nm or below, the height of the second rising surfaces 17 and 18 needs to be 5 nm or above because the reduction of the flying height at an altitude of 3000 m must be 10% (1 nm) or below. Since the accuracy of flying height measurement is on the order of ±1 nm, the reduction of the flying height must be smaller than 1 nm.

Although the second rising surfaces are necessary to reduce the reduction of the flying height at a high altitude, the second rising surfaces are at the minimum flying height if second rising surfaces are excessively high. Therefore a desirable height of the second rising surfaces is in the range of about 5 to 50 nm.

The slider in the first embodiment is a femtoslider. The height of the second rising surfaces of a picoslider of 1.25 mm in overall length may be higher than that of the second rising surfaces of the femtoslider. The maximum height of the second rising surfaces of the picoslider needs to be 74 nm or below to make the picoslider float in the same floating position as the slider in the first embodiment, namely, the femtoslider.

More generally, the decrease of the flying heights 24 and 25 of the back ends of the lands to the minimum flying height can be avoided when the height of the second rising surfaces of sliders including femtosliders and picosliders meet the following expression:

$$h/L < 5.9 \times 10^{-5}$$

where h is the height of the second rising surfaces, and L is the overall length of the slider.

A support point where a load 21 is placed on the slider in the first embodiment is on the side of the air inlet end 1 with respect to the center of the slider and corresponds to the lands 11 and 12. When the aerodynamic pressures 32 and 33 acting on the lands 11 and 12 decreases at a high altitude, a moment Mp tending to decrease the flying height of the air inlet end 1 acts on the slider to suppress the decrease of the flying height 23 of the air outlet end 2.

Figure 9:
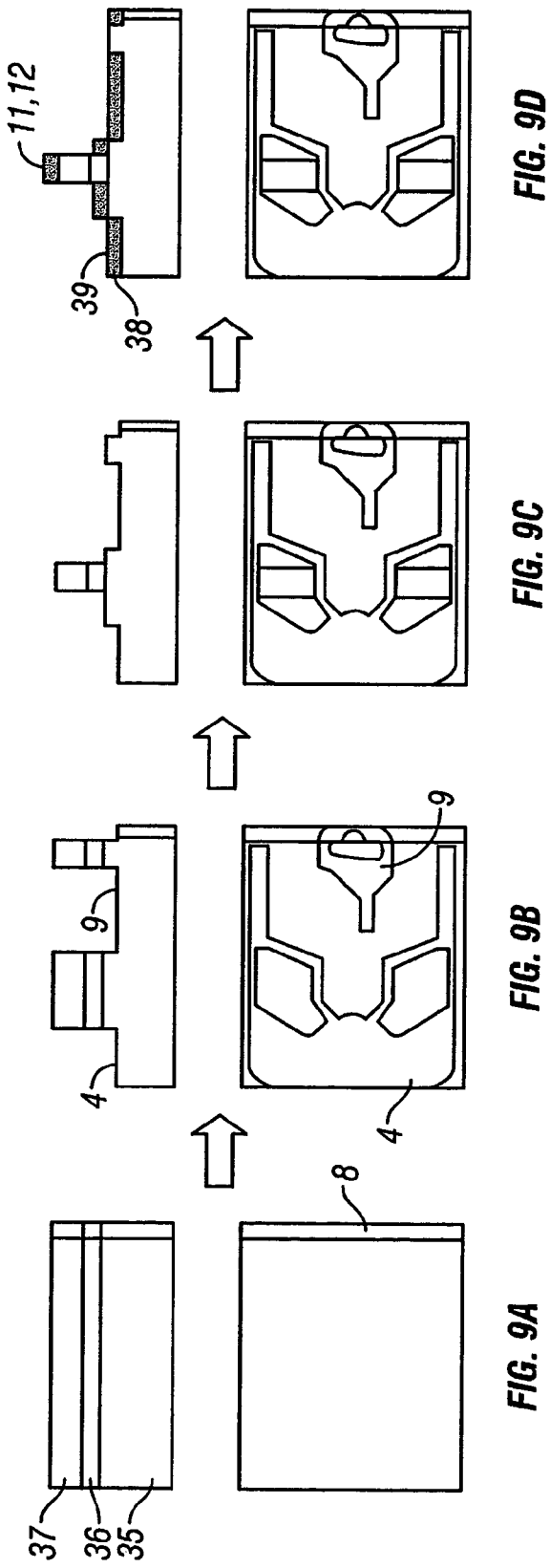
FIG. 9 is a view of assistance in explaining steps of a slider fabricating method of fabricating the magnetic head slider in the first embodiment.

FIG. 9 shows steps of a slider fabricating method by way of example.

A first silicon layer 36 and a first diamond-like carbon layer 37 are formed on an alumina-titanium carbide bar 35, namely, a workpiece, as shown in FIG. 9(1). The sum of the respective thicknesses of the first silicon layer 36 and the firs diamond-like carbon layer 37 is equal to the height of the second rising surfaces 17 and 18. The inlet rails 5 and 6, the outlet rail 7, the bearing surfaces 4 and 9, and the negative-pressure groove 10 are formed as shown in FIG. 9(2) by processing the bar 35 by a conventional slider fabricating process, such as an ion milling process. At this stage, only the inlet rails 5 and 6, and the outlet rail 7 are coated with the diamond-like carbon. Portions, corresponding to the lands 11 and 12, of the surface of the bar 35 are covered with a mask, and portions, other than those corresponding to the lands 11 and 12, of the first diamond-like carbon layer 37 and the first silicon layer 36 are removed as shown in FIG. 9(3).

Then, the entire surface of the bar 35 is coated with a second silicon layer 38 and a second diamond-like carbon layer 39 as shown in FIG. 9(4).

Although the lands 11 and 12 of the slider in the first embodiment are formed by processing the first silicon layer 36 and the first diamond-like carbon layer 37, the lands 11 and 12 may be formed by depositing a silicon layer and a diamond-like layer after the aerodynamic structure (air bearing surface) 3 is completed.

Figure 10:
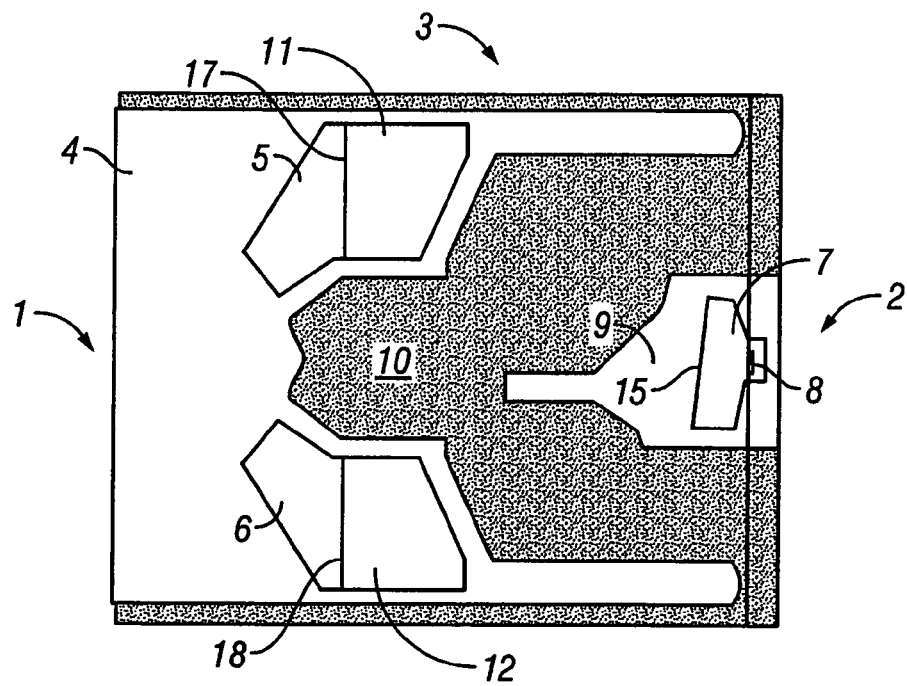
FIG. 10 is a plan view of a magnetic head slider in a second embodiment according to the present invention.

FIG. 10 is a plan view of a magnetic head slider in a second embodiment according to the present invention.

The slider in the second embodiment has inlet rails 5 and 6, and lands 11 and 12 formed on the inlet rails 5 and 6 so as to extend to the back ends of the inlet rails 5 and 6, respectively. Since the lands 11 and 12 are long, an aerodynamic pressure higher than that is produced between the slider in the first embodiment and the magnetic disk can be produced between the slider in the second embodiment and the magnetic disk. The slider in the second embodiment is more effective than the slider in the first embodiment in minimizing the reduction of flying height at a high altitude. Experimental operation of the slider in the second embodiment proved that the slider in the second embodiment could practically perfectly prevent the reduction of flying height at a high altitude of 3000 m.

Figure 11:
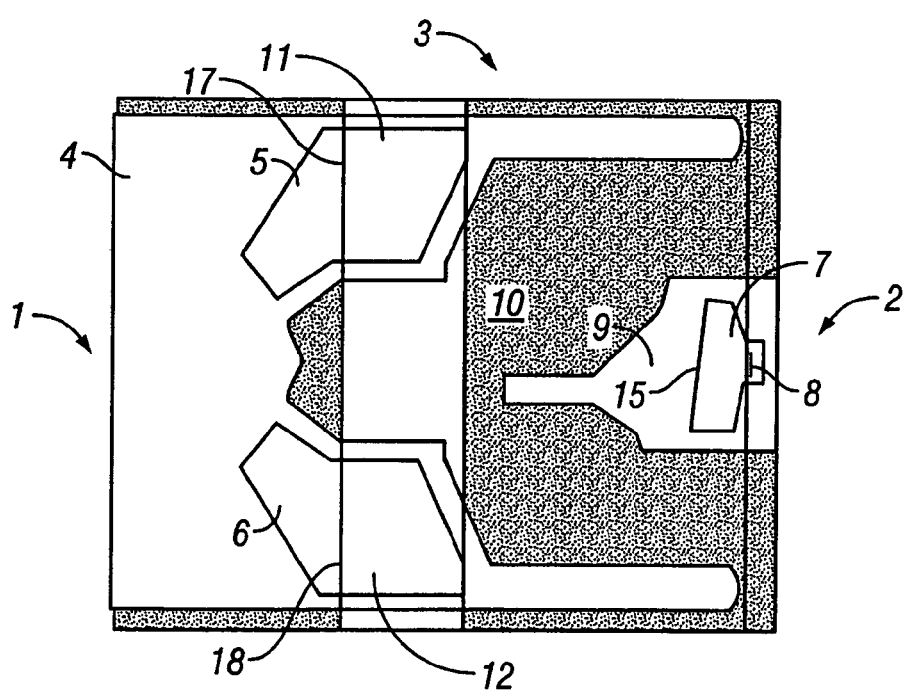
FIG. 11 is a plan view of a magnetic head slider in a third embodiment according to the present invention.

FIG. 11 is a plan view of a magnetic head slider in a third embodiment according to the present invention.

A mask for forming lands 11 and 12 of the slider in the third embodiment has a portion extending across a workpiece for forming the slider over a region including those corresponding to inlet rails 5 and 6. The mask does not need to be positioned very accurately, and the workpiece can be easily processed. The slider in the third embodiment has the effect of the present invention.

Figure 12:
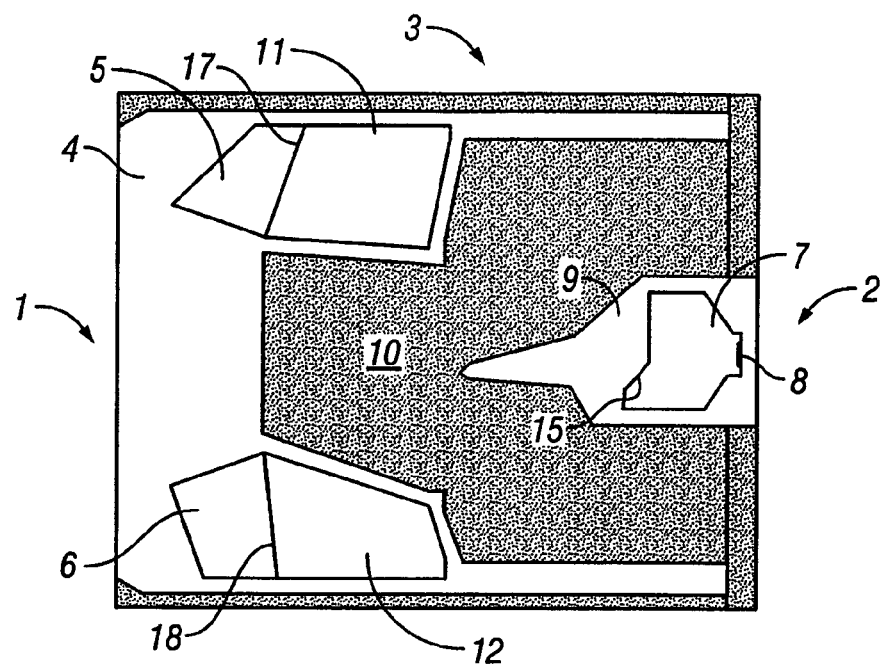
FIG. 12 is a plan view of a magnetic head slider in a fourth embodiment according to the present invention.

FIG. 12 is a plan view of a magnetic head slider in a fourth embodiment according to the present invention.

The slider in the fourth embodiment is provided with inlet rails 5 and 6 and lands 11 and 12 longer than those of the sliders in the foregoing embodiments. Therefore, the rigidity of an air film with respect to a pitching direction increases, and hence the slider is capable of minimizing the variation of flying height due to errors in the pitch attitude of the suspension in addition to minimizing the reduction of flying height with the increase of altitude.

Figure 13:
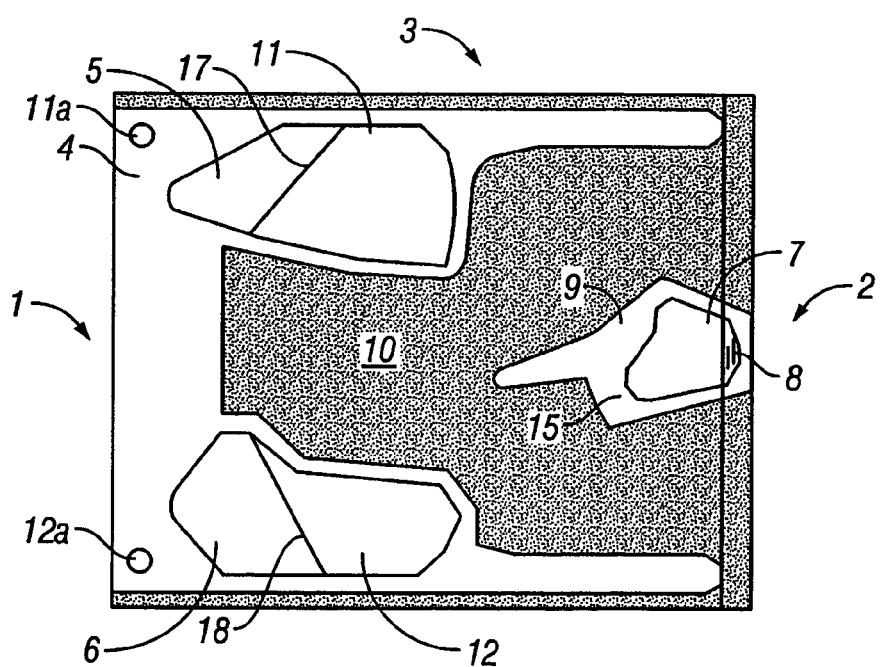
FIG. 13 is a plan view of a magnetic head slider in a fifth embodiment according to the present invention.

FIG. 13 is a plan view of a magnetic head slider in a fifth embodiment according to the present invention.

The slider in the fifth embodiment has an air inlet end 1, an inlet bearing surface 4, lands 11 and 12, and minute pads 11a and 12a formed on the inlet bearing surface 4 in a height equal to that of the lands 11 and 12. The minute pads 11a and 12a prevent the direct contact of the air inlet end 1 with the magnetic disk when the slider is brought into contact with the surface of the disk by some cause. If the air inlet end 1 of the slider comes into direct contact with the disk, a high frictional force acts between the slider and the disk, which is undesirable from the viewpoint of the reliability of the magnetic disk drive.

Figure 14:
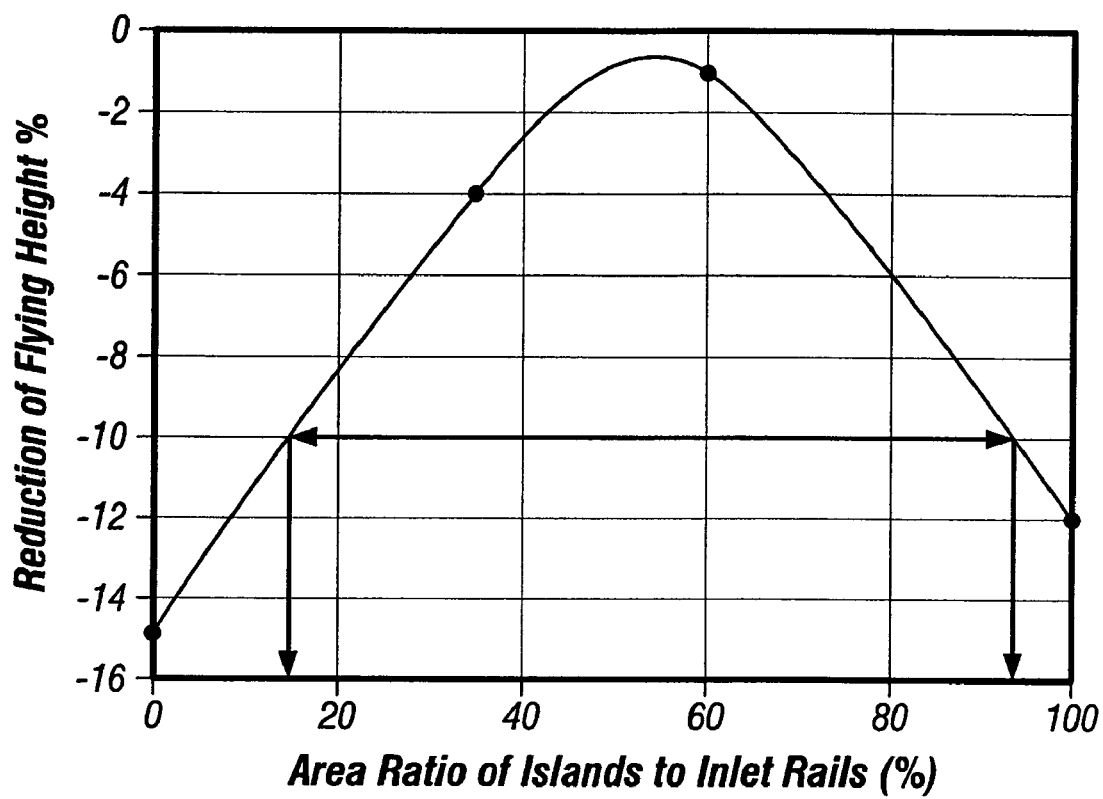
FIG. 14 is a graph showing the relation between the reduction of flying height due to the increase of altitude, and the area ratio of the total area of lands to the total area of inlet rail surfaces.

Test sliders of the same construction as the slider shown in FIG. 13 were simulated. The test sliders were provided with second rising surfaces 17 and 18 formed at different longitudinal positions, and had different area ratios, i.e., the ratios each of the total area of the lands 11 and 12 to the total area of the inlet rail surfaces 5 and 6. FIG. 14 shows simulated reductions in the respective flying heights at an altitude of 0 m of the test sliders and at an altitude of 3000 m. In FIG. 14, the ratio of the reduction of flying height due to the increase of altitude to a flying height at an altitude of 0 m is simulated on the vertical axis. The area ratio must be in the range of about 18 to 92% to limit the reduction of flying height due to increase in altitude to about 10% or below of the flying height at an altitude of 0 m. This condition for the area ratio in the slider in the fifth embodiment applies to the sliders in all the foregoing embodiments.

Figure 15:
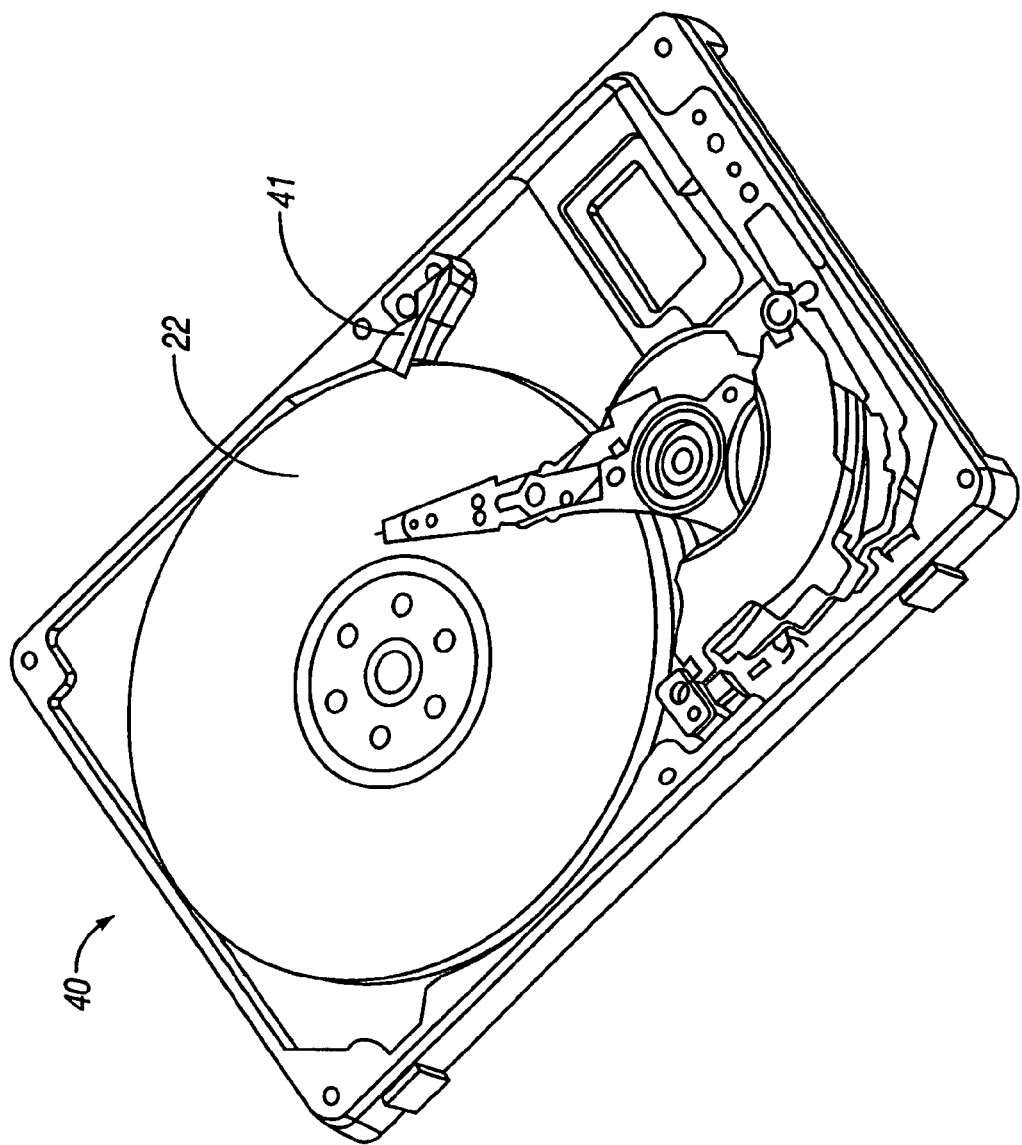
FIG. 15 is a perspective view of a magnetic head drive provided with a magnetic head slider according to the present invention, and a load/unload mechanism.

FIG. 15 is a perspective view of a magnetic disk drive 40 provided with one of the magnetic head sliders in the first to the fifth embodiment according to the present invention.

The magnetic disk drive 40 is provided with a load/unload mechanism. The load/unload mechanism holds the magnetic head slider on a ramp 41 while the magnetic disk drive is stopped or holds the magnetic head slider at a working position for a recording or reproducing operation above a magnetic disk 22 while the magnetic disk drive is in operation.

The slider in the foregoing embodiment capable of reducing the reduction of flying height at a high altitude improves the reliability of the magnetic head drive 40. The effect of the slider of the present invention is particularly significant when the slider of the present invention is applied to a magnetic disk drive provided with small magnetic disks smaller than 2.5 in. magnetic disks.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider comprising:
an air inlet end;
an air outlet end; and
an aerodynamic structure;
wherein the aerodynamic structure includes:
a plurality of inlet rails respectively having inlet rail surfaces;
an outlet rail having an outlet rail surface flush with the inlet rail surfaces and supporting a magnetic head;
a bearing surface extending at a predetermined first depth $\delta 1$ from a reference plane including the inlet and the outlet rail surfaces;
a negative-pressure surface extending in a plane at a predetermined second depth $\delta 2$ greater than the first depth $\delta 1$ from the reference plane; and
longitudinal lands of a predetermined height h formed on and extending between opposite sides of the inlet rails; and
wherein the bearing surface and the inlet rail surfaces extend between the air inlet end and the lands;
wherein the outlet rail surface and the inlet rail surfaces include rising diagonal surfaces formed at the air inlet end;
wherein the inlet rails extend from a position away from the air inlet end to a middle area of the slider at a position before the air outlet end.

2. The magnetic head slider according to claim 1, wherein the height h of the lands is smaller than the depth $\delta 1$ of the bearing surface.

3. The magnetic head slider according to claim 1, wherein the aerodynamic structure is coated with a material which is the same as a material of the lands.

4. The magnetic head slider according to claim 1, wherein the height h of the lands is about 50 nm.

5. The magnetic head slider according to claim 1, wherein the height h of the lands meets a condition expressed by:

$h/L \leq 5.9 \times 10^{-5}$ where h is the height of the lands, and L is the length of the magnetic head slider.

6. The magnetic head slider according to claim 1, wherein the area ratio of the total area of the lands to the total area of the inlet rail surfaces is in a range of about 18 to 92%.

7. The magnetic head slider according to claim 6, wherein the height h of the lands is smaller than the depth $\delta 1$ of the bearing surface.

8. The magnetic head slider according to claim 6, wherein the aerodynamic structure is coated with a material which is the same as a material of the lands.

9. The magnetic head slider according to claim 6, wherein the height h of the lands is about 50 nm.

10. The magnetic head slider according to claim 6, wherein the height h of the lands meets a condition expressed by:

$h/L \leq 5.9 \times 10^{-5}$ where h is the height of the lands, and L is the length of the magnetic head slider.

11. The magnetic head slider according to claim 1, wherein a load is placed on the magnetic head slider at a point on a side of the air inlet end with respect to a center of the magnetic head slider.

12. A magnetic disk drive provided with the magnetic head slider stated in claim 1.

13. A magnetic head slider comprising:
an air inlet end;
an air outlet end;
a negative-pressure groove; and
an aerodynamic structure;
wherein the aerodynamic structure includes:
a longitudinal bearing surface extending toward the air outlet end from the air inlet end;
a first land formed on the bearing surface and having a first step rising diagonally from the bearing surface; and
a second land formed on the first land and having a second step rising from the first step,
wherein the second land extends between opposite sides of the first land;
wherein the first land is formed at a position away from the air inlet end to a middle area of the slider at a position before the air outlet end.

14. The magnetic head slider according to claim 13, wherein the first step rising from the bearing surface is greater than the second step rising from the first step.

15. The magnetic head slider according to claim 13, wherein the second step is about 50 nm.

16. The magnetic head slider according to claim 13, wherein $h/L \leq 5.9 \times 10^{-5}$ where h is a height of the second step, and L is an overall length of the magnetic head slider.

17. The magnetic head slider according to claim 13, wherein the magnetic head slider is configured to receive a load applied at a point on a side of the air inlet with respect to a center of the magnetic head slider.

18. A magnetic disk drive comprising:
a magnetic disk; and
a magnetic head slider according to claim 13.

* * * * *